United States Patent [19]
Miskech et al.

[11] Patent Number: 5,876,077
[45] Date of Patent: Mar. 2, 1999

[54] BUMPER AND FRONT RAIL ASSEMBLY FOR VEHICLE

[75] Inventors: Peter Miskech, Troy; Leonard Anthony Shaner, New Baltimore; Joseph Paul Tekelly, Troy; Bhadresh V. Vyas, Canton; David George Heinemann, Ortonville; David Alan Hall, Novi, all of Mich.

[73] Assignee: Ford Global Technologies, Inc., Dearborn, Mich.

[21] Appl. No.: 796,355

[22] Filed: Feb. 7, 1997

Related U.S. Application Data

[63] Continuation-in-part of Ser. No. 786,584, Jan. 21, 1997.
[51] Int. Cl.⁶ .................................................... B60R 19/26
[52] U.S. Cl. ............................................ 293/132; 296/189
[58] Field of Search .................................... 293/132, 133; 296/189, 188; 188/377

[56] References Cited

U.S. PATENT DOCUMENTS

| | | | |
|---|---|---|---|
| 3,998,485 | 12/1976 | Putter et al. ............................. | 293/132 |
| 4,252,355 | 2/1981 | Goupy et al. ............................. | 293/132 |
| 4,278,282 | 7/1981 | Roubinet et al. ........................ | 293/132 |
| 4,413,856 | 11/1983 | McMahan et al. ....................... | 296/189 |
| 5,100,189 | 3/1992 | Futamara et al. ....................... | 293/132 |
| 5,118,160 | 6/1992 | Kitagawa et al. ....................... | 296/189 |
| 5,139,297 | 8/1992 | Carpenter et al. ...................... | 293/132 |
| 5,171,058 | 12/1992 | Ishikawa ................................. | 296/189 |
| 5,314,229 | 5/1994 | Matuzawa et al. ..................... | 296/189 |

*Primary Examiner*—Russell D. Stormer
*Assistant Examiner*—Long Bao Nguyen
*Attorney, Agent, or Firm*—Daniel M. Stock; Roger L. May

[57] ABSTRACT

A bumper and front rail assembly includes first and second front rails with a steel cross-member extending therebetween. The steel cross-member has a substantially U-shaped cross-section. A steel forward member is secured to the cross-member and spans the length thereof. The forward member is configured to act as a spring for elastic deformation against the cross-member in a low energy impact. First and second steel crush cans are disposed in the cross-member adjacent the first and second front rails, respectively. The crush cans are configured for improved energy management and can be used with or without the energy absorbing bumper system described.

12 Claims, 6 Drawing Sheets

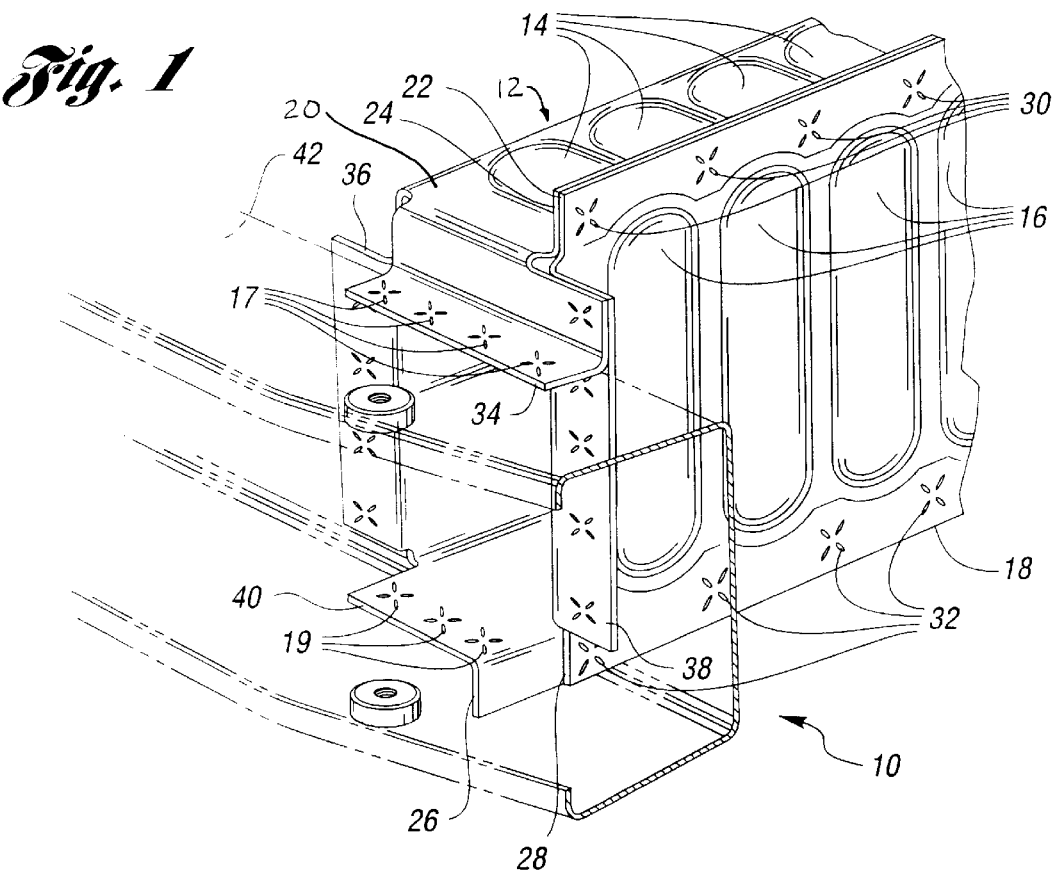
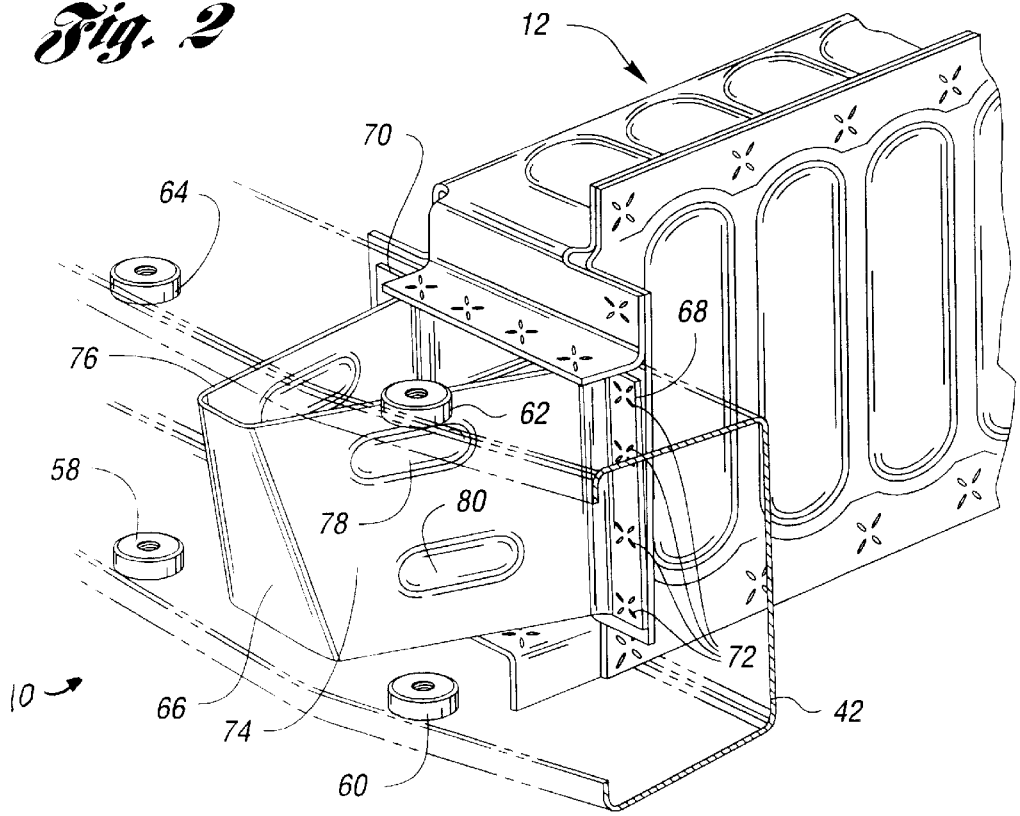

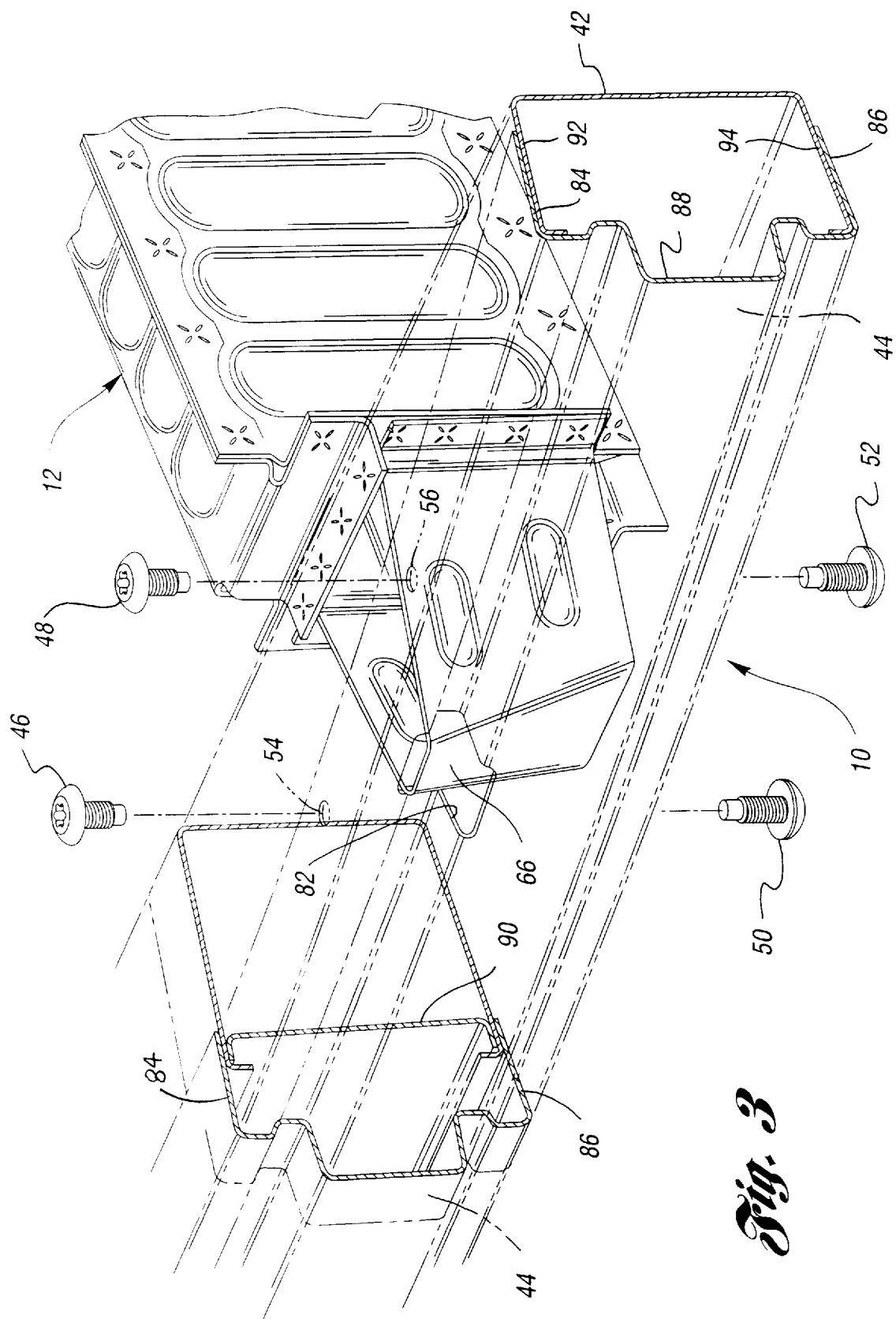

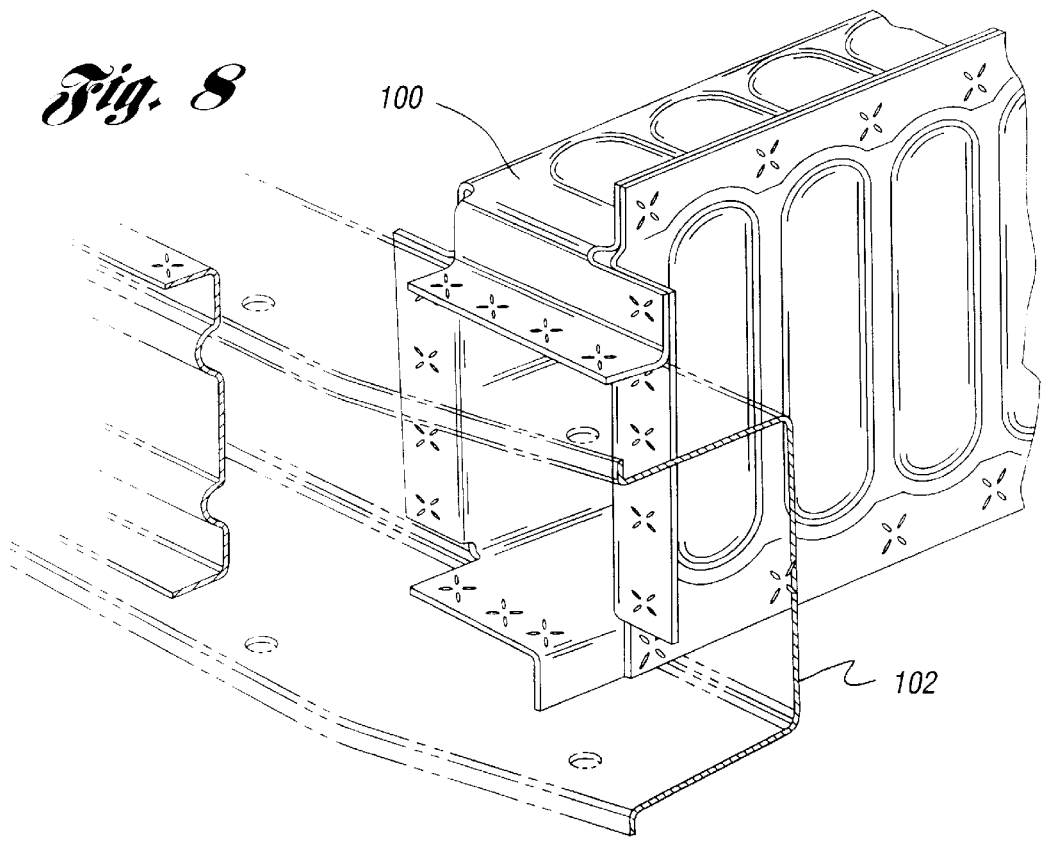
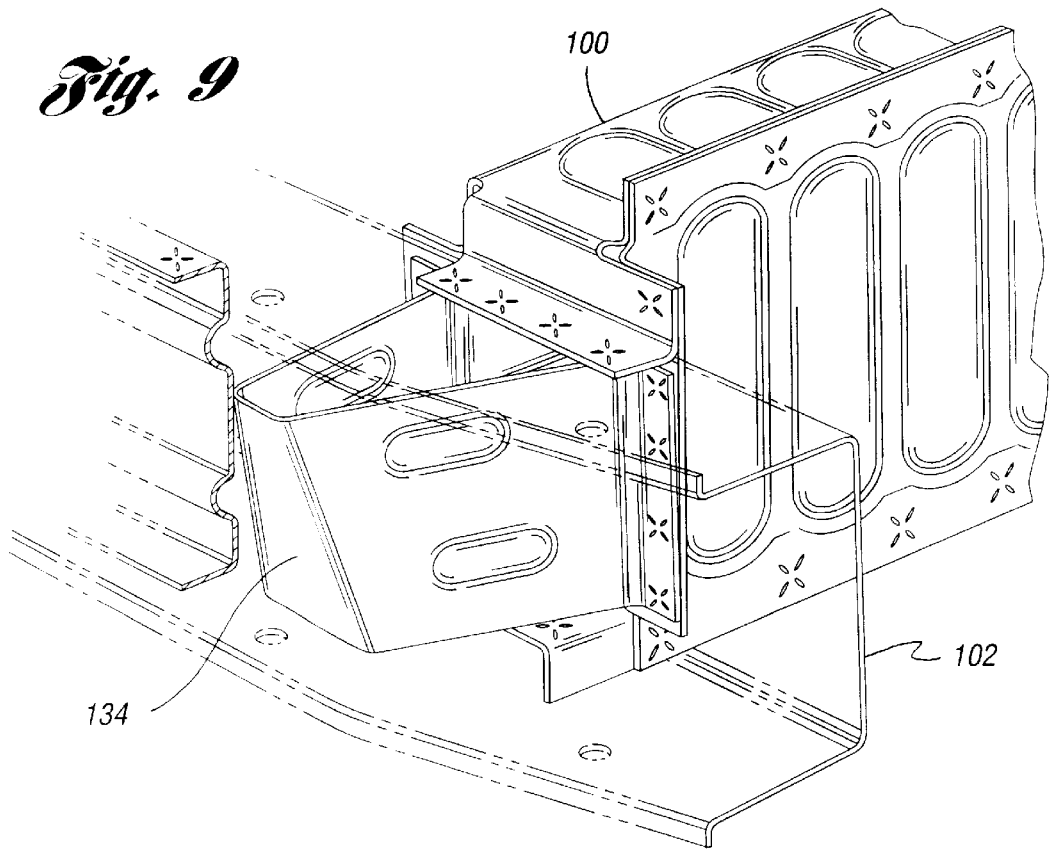

BUMPER AND FRONT RAIL ASSEMBLY FOR VEHICLE

CROSS-REFERENCE TO RELATED APPLICATION

This application is a continuation-in-part of Ser. No. 08/786,584 filed on Jan. 21, 1997, entitled "Bumper And Front Rail Assembly For Vehicle".

TECHNICAL FIELD

The present invention relates to a bumper and front rail assembly for a vehicle including spring-steel like components for improved energy management.

BACKGROUND OF THE INVENTION

Typically, vehicle bumpers comprise a primarily plastic and/or steel construction designed for elastic deformation up to a 5 mile per hour impact. These bumpers are typically not of sufficient structural integrity to dissipate substantial energy in a high energy impact; i.e., an impact between 5 and 40 miles per hour. Accordingly, since such bumper systems are typically 4–6 inches in depth, this 4–6 inches is wasted length which could be used for energy management. Also, such bumpers typically have insufficient structural integrity to generate a deceleration pulse significant enough to be sensed by a vehicle deceleration sensor for airbag deployment.

Another shortcoming of such bumpers is that offset frontal impacts create an energy pulse which is absorbed almost entirely in one of the front rails, and the energy management characteristics of the opposing front rail is not utilized.

Accordingly, it is desirable to provide a bumper and front rail assembly for a vehicle which deforms elastically in a low energy impact (less than 5 miles per hour), and absorbs a greater amount of energy in a high energy or high velocity impact in a manner sufficient to create a deceleration pulse which may be sensed for deployment of an airbag. It is further desirable to create a bumper and front rail assembly for a vehicle in which both front rails are used to dissipate energy in an offset frontal impact.

It is further desirable to provide an apparatus which effectively extends the length of the vehicle side rails without requiring redesign and retooling of the side rail assembly operation. Preferably, such apparatus will perform in crash tests as if the side rails themselves were physically extended in length for additional energy absorption.

DISCLOSURE OF THE INVENTION

The present invention overcomes the above-referenced shortcomings of prior art vehicle bumper and front rail assemblies by providing a bumper assembly which comprises elongated engaging high strength steel members adapted for elastic deformation in a low energy impact, and further comprises crush cans disposed therebetween for increased energy dissipation in a high energy impact. One of the elongated steel members is welded at locations positioned along its length to the front rails for added torsional rigidity to distribute load between the front rails in an offset impact.

More specifically, the present invention provides a bumper and front rail assembly for a vehicle including first and second front rails and a steel cross-member extending therebetween. The steel cross-member has a substantially U-shaped cross-section. A steel forward member is secured to the cross-member and spans the length thereof. The forward member is configured to act as a spring for elastic deformation against the cross-member in a low energy impact. First and second steel crush cans are disposed in the cross-member adjacent the first and second front rails, respectively. The crush cans are configured for improved energy management.

By providing the crush cans prefabricated to a shape consistent with its initial stages of deformation, the energy absorption characteristics of the crush cans are sufficiently enhanced to effectively increase the length of the side rails by merely placing the redesigned crush cans on the ends of the side rails. The crush can comprises opposing side walls having attachment flanges extending therefrom for attachment with respect to the side rail. The side walls are substantially angled with respect to each other, and each side wall includes an outwardly facing surface with a first convex portion and a second concave portion. A center support extends between the side walls.

Accordingly, an object of the present invention is to provide a bumper and front rail assembly for a vehicle including engaging elongated steel members configured for elastic deformation in a low energy impact, and also including crush cans secured therein and adapted for increased energy absorption in a high energy impact.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 shows a partially phantom perspective view of a front rail and cross-member assembly in accordance with the present invention;

FIG. 2 shows a partially phantom perspective view of a front rail, cross-member and crush can assembly in accordance with the embodiment shown in FIG. 1;

FIG. 3 shows a partially phantom perspective view of a bumper and front rail assembly in accordance with the present invention corresponding with the embodiment shown in FIGS. 1 and 2;

FIG. 8 shows a partially phantom perspective view of a front rail, cross-member and reinforcement member assembly in accordance with the embodiment shown in FIG. 7;

FIG. 9 shows a partially phantom perspective view of a front rail, cross-member and crush can in accordance with the embodiment shown in FIGS. 7 and 8;

DETAILED DESCRIPTION OF THE PREFERRED EMBODIMENT

Figure 6:
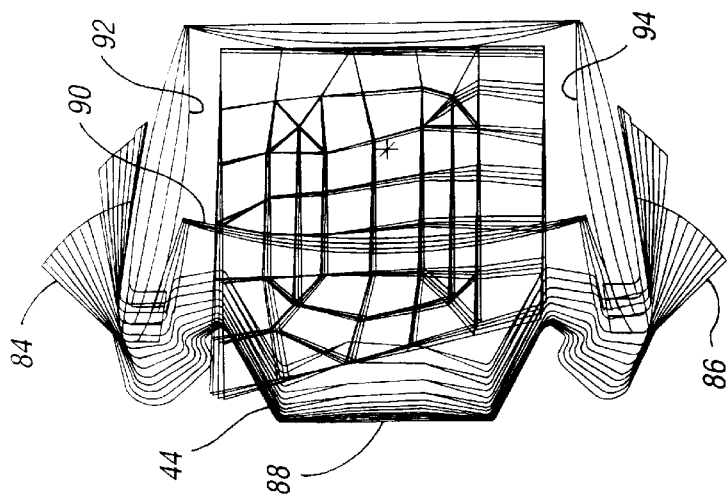
FIG. 6 shows a schematic finite element analysis model of a fully elastically deformed bumper, cross-member and crush can assembly in accordance with the structure shown in FIGS. 4 and 5 illustrating sequential deformation positions.

Referring to FIGS. 1–3, a bumper and front rail assembly 10 is shown in accordance with a first embodiment of the present invention. The bumper and front rail assembly 10 includes first and second front rails 12 (only one such rail is shown in FIGS. 1–3). The front rails 12 each include a plurality of convolutions 14, 16 formed thereon to encourage natural and substantially sequential deformation of the rail 12 in a high energy impact. Each front rail 12 includes mating high strength steel components 18, 20 having flanges 22, 24, 26, 28 extending therefrom to facilitate welding of the rail components 18, 20 together at the weld locations 30, 32, shown in FIG. 1.

The front rails 12 also include forward flanges 34, 36, 38, 40 which are adapted for welding to the steel cross-member 42 which extends between the first and second front rails 12 and comprises a substantially U-shaped cross-section. By welding the cross-member 42 to the front rails 12 at a plurality of locations 17 and 19 arranged longitudinally with respect to the cross-member, torsional rigidity is improved at the joint between the steel cross-member and the respective side rail such that energy from an offset frontal impact is more evenly distributed between the opposing front rails for energy management and dissipation.

Turning to FIG. 3, the bumper and front rail assembly 10 also includes a steel forward member 44 secured to the cross-member 42 and spanning the length thereof. The forward member 44 is configured to act as a spring for elastic deformation against the cross-member 42 in a low energy impact. The forward member 44 is secured to the cross-member 42 by the screws 46, 48, 50, 52 which extend through apertures 54, 56, which are positioned along the cross-member 42 closely adjacent the respective front rail, and engage the threaded nuts 58, 60, 62, 64. In this configuration, substantial elastic flexing of the forward member 44 is allowed with respect to the cross-member 42 in a low energy impact.

As shown in FIG. 3, the bumper and front rail assembly 10 further comprises a steel reinforcement member 90 extending within the cross-member 42. The reinforcement member 90 and cross-member 42 cooperate to form a substantially rectangular cross-section for improved structural integrity.

The bumper and front rail assembly 10 further includes a crush can 66 disposed within the cross-member 42 immediately adjacent each front rail. The crush can 66 includes opposing flanges 68, 70 extending therefrom to be welded to the rear of the cross-member 42 at the weld locations 72, as shown in FIG. 2. The crush cans 66 comprise high strength steel having tapered opposing walls 74, 76 which extend to the opposing flanges 68, 70, respectively. The opposing walls 74, 76 have elongated bumps 78, 80 formed thereon for added structural integrity. These crush cans 66 are configured for slight elastic deformation in a low energy impact, and are further configured for added structural integrity in a high energy impact. The reinforcement member 90 discussed above extends between the crush cans 66.

Figure 5:
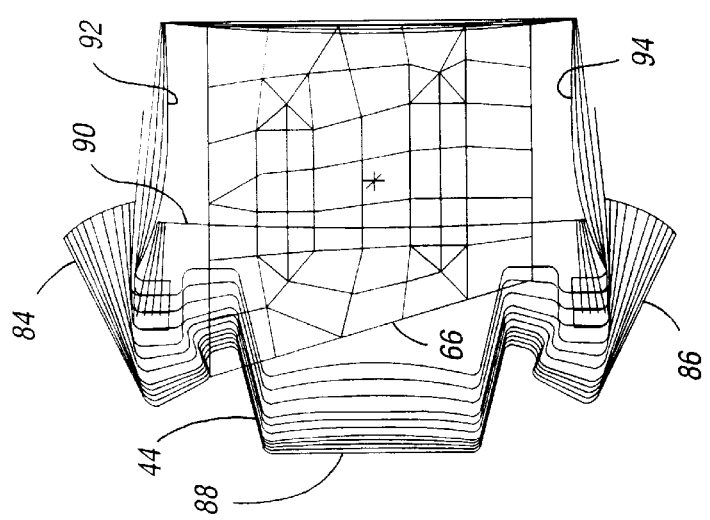
FIG. 5 shows a schematic finite element analysis model of a partially elastically deformed bumper, cross-member and crush can assembly in accordance with the embodiment shown in FIG. 4 illustrating sequential deformation positions.
Figure 4:
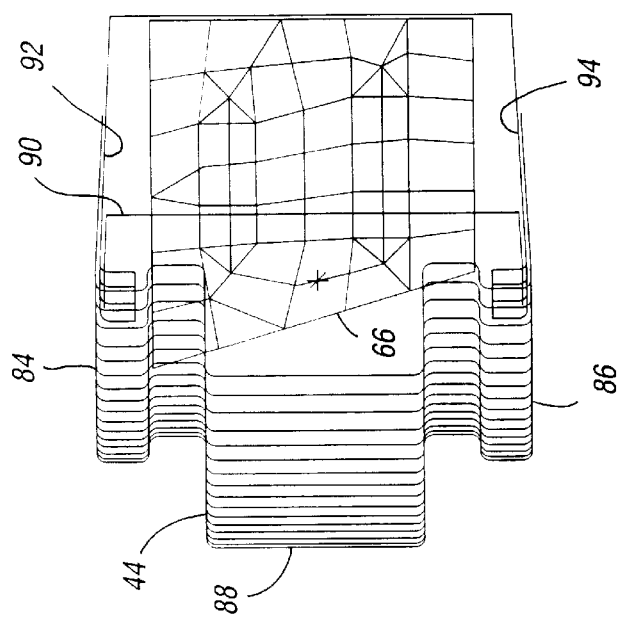
FIG. 4 shows a schematic finite element analysis model of the bumper, cross-member and crush can assembly of FIG. 3, taken along the center line of the front rail.

As shown in FIG. 3, an aperture 82 is formed in the forward member 44 so that crush can 66 does not interfere therewith in a low energy impact. In a low energy impact, the outer flanges 84, 86 extend outwardly away from the cross-member 42 as the center portion 88 is deflected inward. This elastic deformation is illustrated sequentially in FIGS. 4–6. As shown, the center portion 88 is compressed into the cross-member 42 as the outer flanges 84, 86 of the forward member 44 expand outwardly. The center portion 88 continues to deform into the cross-member 42 until the crush can 66 engages the forward peripheral edge of the aperture 82 in the forward member 44 such that the crush can 66 also begins to deform elastically, and the reinforcement member 90 also begins to bend elastically as a result of the slight separation of the opposing sides 92, 94 of the cross-member 42. Deformation beyond this elastic point then becomes inelastic and the crush cans are operative to dissipate substantial energy in a high energy impact.

Figure 7:
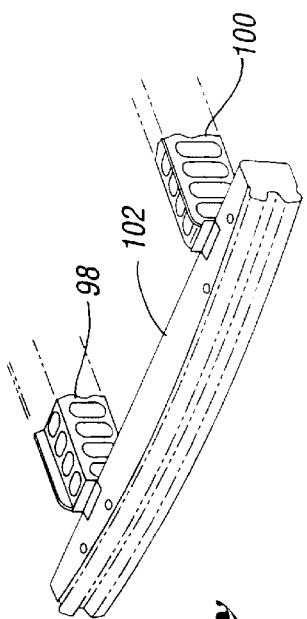
FIG. 7 shows a partially phantom perspective view of a bumper and front rail assembly in accordance with an alternative embodiment of the present invention.

Turning to FIGS. 7–9, an alternative embodiment of the present invention is shown. As shown in FIG. 7, this embodiment also comprises first and second front rails 98, 100 having a cross-member 102 extending therebetween. This embodiment further comprises a forward member 104 secured by screws 106, 108, 110, 112 to the cross-member 102. A front plate 114 is welded to the forward member 104 to prevent buckling during certain frontal impacts. This embodiment also includes a center reinforcement 116 secured within the forward member 104 and having curves 118, 120 formed therealong for added structural integrity. The forward member 102 is welded to the front rails 98, 100 in the same manner as described above with reference to the embodiment shown in FIGS. 1–3. The reinforcement 116 is also welded to the cross-member 102.

Figure 10:
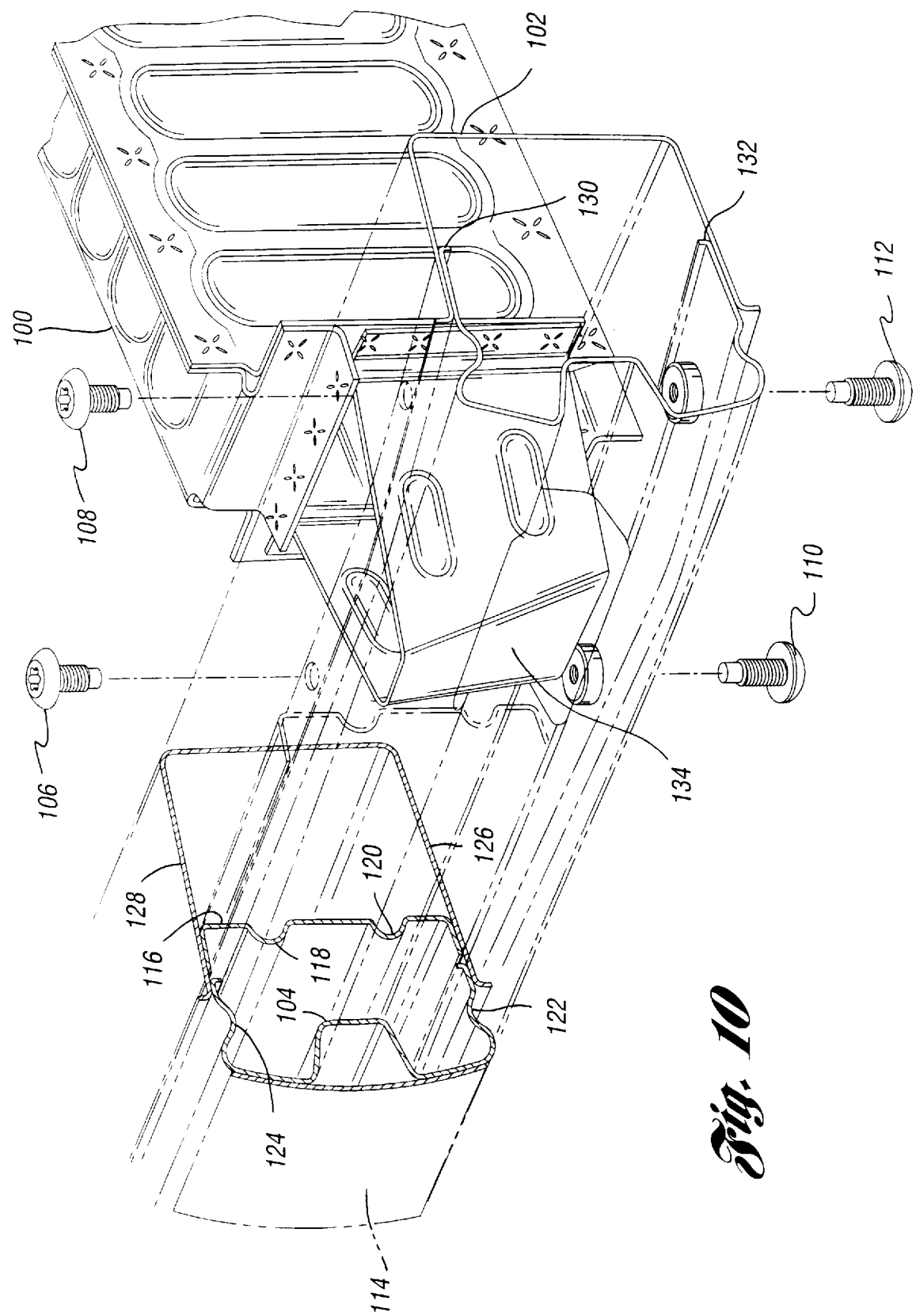
FIG. 10 shows a partially phantom partially cut-away perspective view of a bumper and front rail assembly in accordance with the embodiment shown in FIGS. 7–9.

In this embodiment, the forward member 104 includes opposing flanges 122, 124 which are disposed within the opposing sides 126, 128 of the cross-member 102 so that the opposing flanges 122, 124 are elastically deformed inwardly with respect to the opposing sides 126, 128 of the cross-member 102 in a low energy impact situation. The opposing flanges 122, 124 include inwardly projecting portions 130, 132, shown in FIG. 10, to encourage such inward elastic deformation.

This embodiment also includes opposing crush cans 134 for further energy management.

Accordingly, in the above-described embodiments, low energy elastic deformation is achieved, as well as providing a front-loaded pulse for higher energy impacts which is operative to deploy an airbag and to begin substantial energy dissipation in the bumper area. These embodiments also provide more even loading of the opposing front rails in a frontal offset impact. To date, no such bumper and front system has been provided with such diverse energy management characteristics.

Each structural component comprises a high strength stamped steel which allows spring action in a 5 mile per hour impact. This spring action absorbs impact energy of the vehicle by allowing the forward member to deflect into the reinforcement and then both distort as a unit well within the elastic range of the material. Both parts are stressed on all surfaces relatively uniformly, thereby preventing localized high stress areas and permanent set. The shapes of the cross-member, reinforcement, and forward member affect energy management and impact response to prevent front fascia damage. The forward member tends to become straight because of the plan view sweep which grows in width, causing the forward member to load the crush cans. The stiffness of the vehicle front rails is set to yield above the yield point of the bumper system so there is no damage in a low energy impact.

Figure 11:
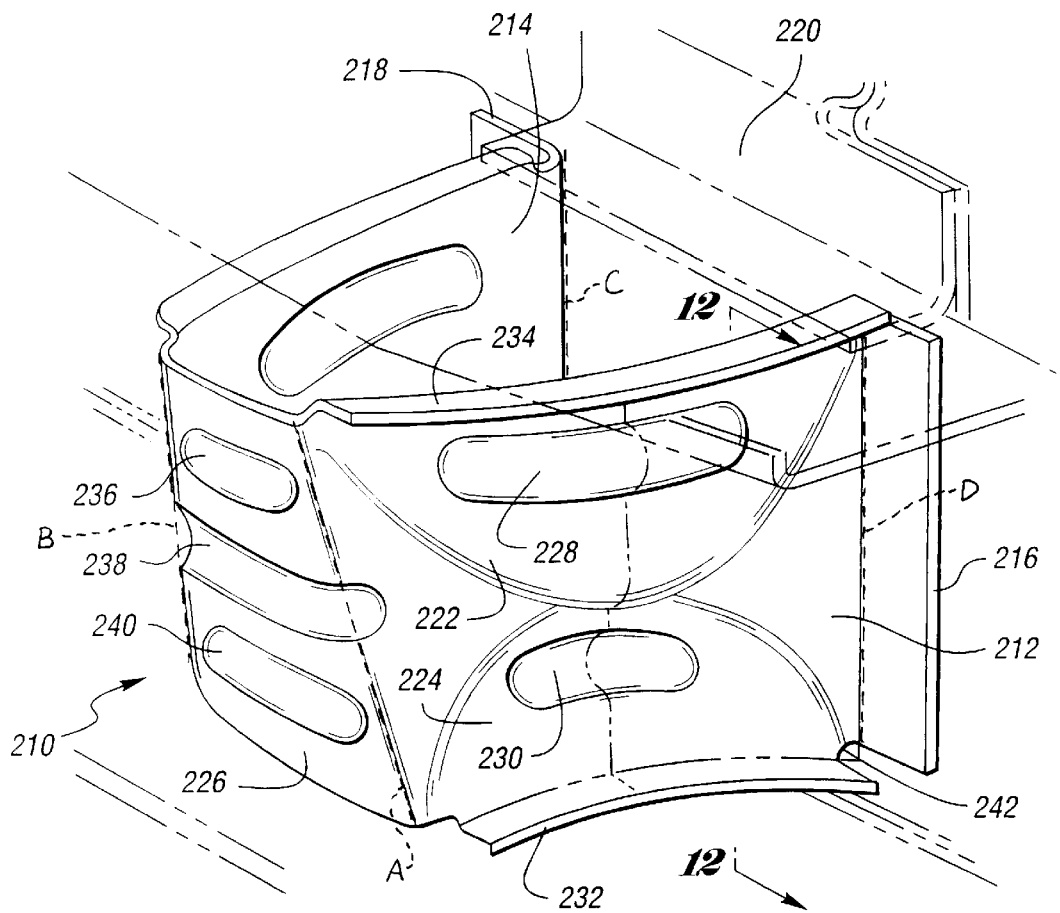
FIG. 11 shows a partially phantom partially cut-away perspective view of a crush can in accordance with a second alternative embodiment of the present invention.
Figure 12:
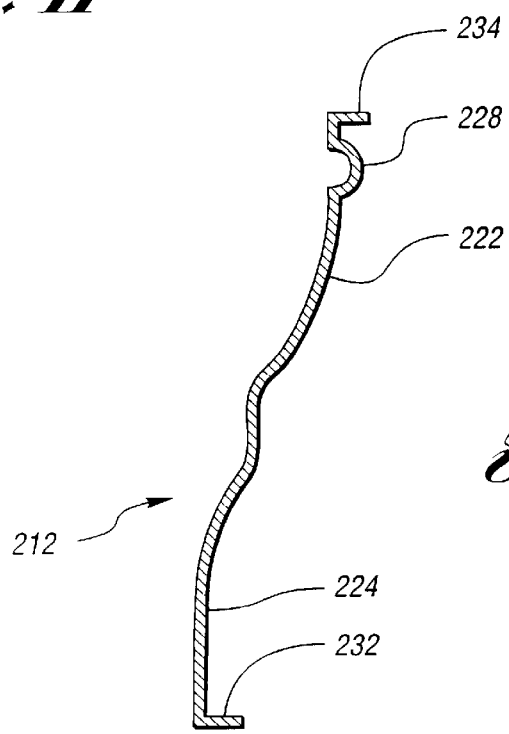
FIG. 12 shows a vertical cross-sectional view taken through line 12—12 of FIG. 11.

Referring to FIGS. 11 and 12, a second alternative embodiment of the present invention is shown. The crush can embodiment shown can be used with or without the bumper system described with reference to FIGS. 1–10. In this particular embodiment, the crush can 210 is prefabricated to its initial deformation position, thereby substantially improving its energy absorption characteristics. The crush can 210 includes opposing side walls 212, 214 with attachment flanges 216, 218 extending therefrom for attachment with respect to the side rail 220. The side walls 212, 214 are substantially angled with respect to each other, and each side wall includes an outwardly facing surface with a first convex portion 222 and a second concave portion 224. Each side wall 212, 214 also includes upper and lower edges with reinforcement flanges 232, 234 extending outwardly therefrom for added structural integrity.

A center support 226 extends between the side walls 212, 214. The center support 226 lies substantially in a plane defined by imaginary lines A and B. This plane is angled with respect to the plane formed by lines C and D, through which the attachment flanges 216, 218 extend.

Lines A and B converge above the part, and lines C and D converge below the part as viewed in FIG. 11.

Each first concave portion 222 comprises an outwardly extending elongated bump or bead 228. Each second concave portion 224 comprises an inwardly extending elongated bump or bead 230 formed thereon. The center support 226 also includes a plurality of elongated bumps 236, 238, 240.

As shown in FIG. 12, which is a vertical cross-section taken through line 12—12 of FIG. 11, each side wall 212, 214 forms an approximate parabolic curve as the first convex portion and second concave portion blend together.

Turning back to FIG. 11, a ball corner 242 is formed between flange 232 and flange 216 to enhance deformation behavior.

Accordingly, with the crush can positioned at the end of the side rail 220, the length of the side rail is effectively extended for purposes of energy management. In this configuration, the space inside the bumper is utilized for energy dissipation. Additionally, the crush can 210 may be made inexpensively by a blank and form stamping operation.

While the best modes for carrying out the invention have been described in detail, those familiar with the art to which this invention relates will recognize various alternative designs and embodiments for practicing the invention within the scope of the appended claims.

What is claimed is:

1. A crush can for effectively extending the length of a vehicle side rail, comprising:

opposing side walls having attachment flanges extending therefrom for attachment with respect to the side rail, said side walls being substantially angled with respect to each other, and each said side wall having an outwardly facing surface with a first convex portion and a second concave portion offset from each other in a direction directly perpendicular to the length of the side rail; and a center support extending between said side walls.

2. The crush can of claim 1, wherein each said first convex portion comprises an outwardly extending elongated bump formed thereon and each said second concave portion comprises an inwardly extending elongated bump formed thereon.

3. The crush can of claim 1, wherein said first convex portion and second concave portion blend together to form an approximate parabolic curve in vertical cross-section.

4. The crush can of claim 1, wherein each said side wall comprises upper and lower edges with reinforcement flanges extending outwardly therefrom.

5. The crush can of claim 1, wherein said center support comprises a plurality of parallel elongated bumps extending therefrom.

6. The crush can of claim 1, wherein said attachment flanges lie in a first plane, and said center support lies substantially in a second plane which is tilted with respect to and intersects the first plane.

7. A bumper and front rail assembly for a vehicle, comprising:

first and second front rails;

a steel cross member extending between said first and second front rails and having a substantially U-shaped cross-section;

a steel forward member secured to said cross member and spanning the length thereof, said forward member being configured to act as a spring for elastic deformation against the cross member in a low energy impact; and first and second steel crush cans disposed in said cross member adjacent said first and second front rails, respectively;

wherein each said crush can comprises opposing side walls having attachment flanges extending therefrom for attachment with respect to the side rail, said side walls being substantially angled with respect to each other, and each said side wall having an outwardly facing surface with a first convex portion and a second concave portion, and said crush can further comprises a center support extending between said side walls.

8. The bumper and front rail assembly of claim 7, wherein each said first convex portion comprises an outwardly extending elongated bump formed thereon and each said second concave portion comprises an inwardly extending elongated bump formed thereon.

9. The bumper and front rail assembly of claim 7, wherein said first convex portion and second concave portion blend together to form an approximate parabolic curve in vertical cross-section.

10. The bumper and front rail assembly of claim 7, wherein each said side wall comprises upper and lower edges with reinforcement flanges extending outwardly therefrom.

11. The bumper and front rail assembly of claim 7, wherein said center support comprises a plurality of parallel elongated bumps extending therefrom.

12. A crush can for effectively extending the length of a vehicle side rail, comprising:

opposing side walls having attachment flanges extending therefrom for attachment with respect to the side rail, said side walls being substantially angled with respect to each other, and each said side wall having an outwardly facing surface with a first convex portion and a second concave portion, wherein each said first convex portion comprises an outwardly extending elongated bump formed thereon and each said second concave portion comprises an inwardly extending elongated bump formed thereon; and wherein said first convex portion and second concave portion blend together to form an approximate parabolic curve in vertical cross-section extending in a direction directly perpendicular to the length of the side rail.

* * * * *